US009564649B2

(12) United States Patent
Yoshimine

(10) Patent No.: US 9,564,649 B2
(45) Date of Patent: Feb. 7, 2017

(54) FUEL CELL MODULE

(71) Applicant: HONDA MOTOR CO., LTD., Tokyo (JP)

(72) Inventor: Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/438,344

(22) PCT Filed: Oct. 7, 2013

(86) PCT No.: PCT/JP2013/077684
§ 371 (c)(1),
(2) Date: Apr. 24, 2015

(87) PCT Pub. No.: WO2014/073319
PCT Pub. Date: May 15, 2014

(65) Prior Publication Data
US 2015/0288017 A1 Oct. 8, 2015

(30) Foreign Application Priority Data

Nov. 7, 2012 (JP) ................................. 2012-245367

(51) Int. Cl.
H01M 6/18 (2006.01)
H01M 8/06 (2016.01)
(Continued)

(52) U.S. Cl.
CPC ............ H01M 8/0618 (2013.01); C01B 3/384 (2013.01); H01M 8/04022 (2013.01);
(Continued)

(58) Field of Classification Search
None
See application file for complete search history.

(56) References Cited

U.S. PATENT DOCUMENTS 7,628,963 B2 * 12/2009 Woo .................. B01J 8/0465
422/198
9,240,601 B2 * 1/2016 Yoshimine ........ H01M 8/04291
(Continued)

FOREIGN PATENT DOCUMENTS

JP 2001-236980 8/2001
JP 2004-288434 10/2004
(Continued)

OTHER PUBLICATIONS

This application is co-pending with U.S. Appl. No. 14/438,332, filed Apr. 24, 2015, and U.S. Appl. No. 14/438,339, filed Apr. 24, 2015.
(Continued)

Primary Examiner — Lucas J O Donnell
(74) Attorney, Agent, or Firm — Rankin, Hill & Clark LLP

(57) ABSTRACT

A fuel cell module includes a fuel cell stack and fuel cell peripheral equipment. The fuel cell module includes a first area where an exhaust gas combustor and a start-up combustor are provided, a second area where a reformer and an evaporator are provided, and a third area where a heat exchanger is provided. The fuel cell module further includes a condensed water recovery mechanism for recovering condensed water produced through condensation of water vapor contained in a combustion gas, by flowing the condensed water through the third area, the second area, and the first area in that order.

10 Claims, 12 Drawing Sheets

(51) Int. Cl.
  *H01M 8/04* (2016.01)
  *C01B 3/38* (2006.01)
  *H01M 8/12* (2016.01)

(52) U.S. Cl.
  CPC ..... *H01M 8/04268* (2013.01); *H01M 8/0612* (2013.01); *C01B 2203/0233* (2013.01); *C01B 2203/066* (2013.01); *C01B 2203/1235* (2013.01); *C01B 2203/1294* (2013.01); *C01B 2203/1604* (2013.01); *H01M 2008/1293* (2013.01); *H01M 2300/0074* (2013.01); *Y02E 60/324* (2013.01); *Y02E 60/50* (2013.01); *Y02E 60/525* (2013.01)

(56) References Cited

U.S. PATENT DOCUMENTS

| | | |
|---|---|---|
| 2001/0009732 A1 | 7/2001 | Schuler |
| 2003/0161768 A1 | 8/2003 | Kawamoto et al. |
| 2010/0021784 A1 | 1/2010 | Fourmigue |

FOREIGN PATENT DOCUMENTS

| | | |
|---|---|---|
| JP | 2007-035387 | 2/2007 |
| JP | 2010-504607 | 2/2010 |
| JP | 2010-132551 | 6/2010 |

OTHER PUBLICATIONS

Japanese Office Action with partial English translation dated Aug. 11, 2015, 4 pages.

\* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The solid electrolyte is interposed between an anode and a cathode to form an electrolyte electrode assembly (hereinafter also referred to as MEA). The electrolyte electrode assembly is sandwiched between separators (bipolar plates). In use, generally, predetermined numbers of the electrolyte electrode assemblies and the separators are stacked together to form a fuel cell stack.

As a system including this type of fuel cell stack, for example, a fuel cell battery disclosed in Japanese Laid-Open Patent Publication No. 2001-236980 (hereinafter referred to as the conventional technique 1) is known. As shown in FIG. 10, the fuel cell battery includes a fuel cell stack $1a$, and a heat insulating sleeve $2a$ is provided at one end of the fuel cell stack $1a$. A reaction device $4a$ is provided in the heat insulating sleeve $2a$. The reaction device $4a$ includes a heat exchanger $3a$.

In the reaction device $4a$, as a treatment of liquid fuel, partial oxidation reforming which does not use water is performed. After the liquid fuel is evaporated by an exhaust gas, the liquid fuel passes through a feeding point $5a$ which is part of the heat exchanger $3a$. The fuel contacts an oxygen carrier gas heated by the exhaust gas thereby to induce partial oxidation reforming, and then, the fuel is supplied to the fuel cell stack $1a$.

Further, as shown in FIG. 11, a solid oxide fuel cell disclosed in Japanese Laid-Open Patent Publication No. 2010-504607 (PCT) (hereinafter referred to as the conventional technique 2) has a heat exchanger $2b$ including a cell core $1b$. The heat exchanger $2b$ heats the cathode air utilizing waste heat.

Further, as shown in FIG. 12, a fuel cell system disclosed in Japanese Laid-Open Patent Publication No. 2004-288434 (hereinafter referred to as the conventional technique 3) includes a first area $1c$ having a circular cylindrical shape extending vertically, and an annular second area $2c$ around the first area $1c$, an annular third area $3c$ around the second area $2c$, and an annular fourth area $4c$ around the third area $3c$.

A burner $5c$ is provided in the first area $1c$, and a reforming pipe $6c$ is provided in the second area $2c$. A water evaporator $7c$ is provided in the third area $3c$, and a CO shift converter $8c$ is provided in the fourth area $4c$.

SUMMARY OF INVENTION

In the conventional technique 1, at the time of reforming by partial oxidation in the reaction device $4a$, heat of the exhaust gas is used for heating the liquid fuel and the oxygen carrier gas. Therefore, the quantity of heat for raising the temperature of the oxygen-containing gas supplied to the fuel cell stack $1a$ tends to be inefficient, and the efficiency is low.

Further, the temperature of the exhaust gas progressively decreases toward the outer side of the reaction device $4a$. Thus, water vapor contained in the exhaust gas is cooled, and condensed water tends to be easily generated. Therefore, the condensed water stagnates in the reaction device $4a$, resulting in degradation of the components.

Further, in the conventional technique 2, in order to increase heat efficiency, long flow channels are adopted to have a sufficient heat transmission area. Therefore, considerably high pressure losses tend to occur. Further, the disposal of condensed water is difficult, and the condensed water tends to easily stagnate in the apparatus. Thus, the components are deteriorated by the condensed water.

Further, in the conventional technique 3, radiation of the heat from the central area having the highest temperature is suppressed using heat insulation material (partition wall). Therefore, heat cannot be recovered, and the efficiency is low. Further, the disposal of condensed water is difficult, and the condensed water tends to easily stagnate in the apparatus. Thus, the components are deteriorated by the condensed water.

The present invention has been made to solve the problems of this type, and an object of the present invention is to provide a fuel cell module having simple and compact structure in which it is possible to achieve improvement in the heat efficiency and facilitation of thermally self-sustaining operation and also it is possible to recover condensed water reliably.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area and where the reformer and the evaporator are provided, an annular third area around the second area and where the heat exchanger is provided, and a condensed water recovery mechanism for recovering condensed water produced through condensation of water vapor contained in the combustion gas, by flowing the condensed water through the third area, the second area, and the first area in that order.

In the present invention, the first area including the exhaust gas combustor and the start-up combustor is centrally-located. The annular second area is successively provided around the first area, and the annular third area is then provided around the second area. The reformer and the evaporator are provided in the second area, and the heat exchanger is provided in the third area.

In the structure, heat waste and heat radiation are suppressed suitably. Thus, improvement in the heat efficiency is achieved, and thermally self-sustaining operation is facilitated. Further, simple and compact structure is achieved in the entire fuel cell module. The thermally self-sustaining operation herein means operation where the operating temperature of the fuel cell is maintained using only heat energy generated by the fuel cell itself, without supplying additional heat from the outside.

Further, since the condensed water recovery mechanism is provided, condensed water produced through condensation of water vapor contained in the combustion gas can flow through the third area, the second area, and the first area in that order, i.e., from the low temperature side to the high temperature side. Thus, rechange of the condensed water into vapor state is facilitated, and accordingly the condensed water does not stagnate in the FC peripheral equipment. Therefore, condensed water is prevented from affecting the durability of the FC peripheral equipment as much as possible, and the recovered condensed water can be utilized as water vapor for reforming.

The above and other objects features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
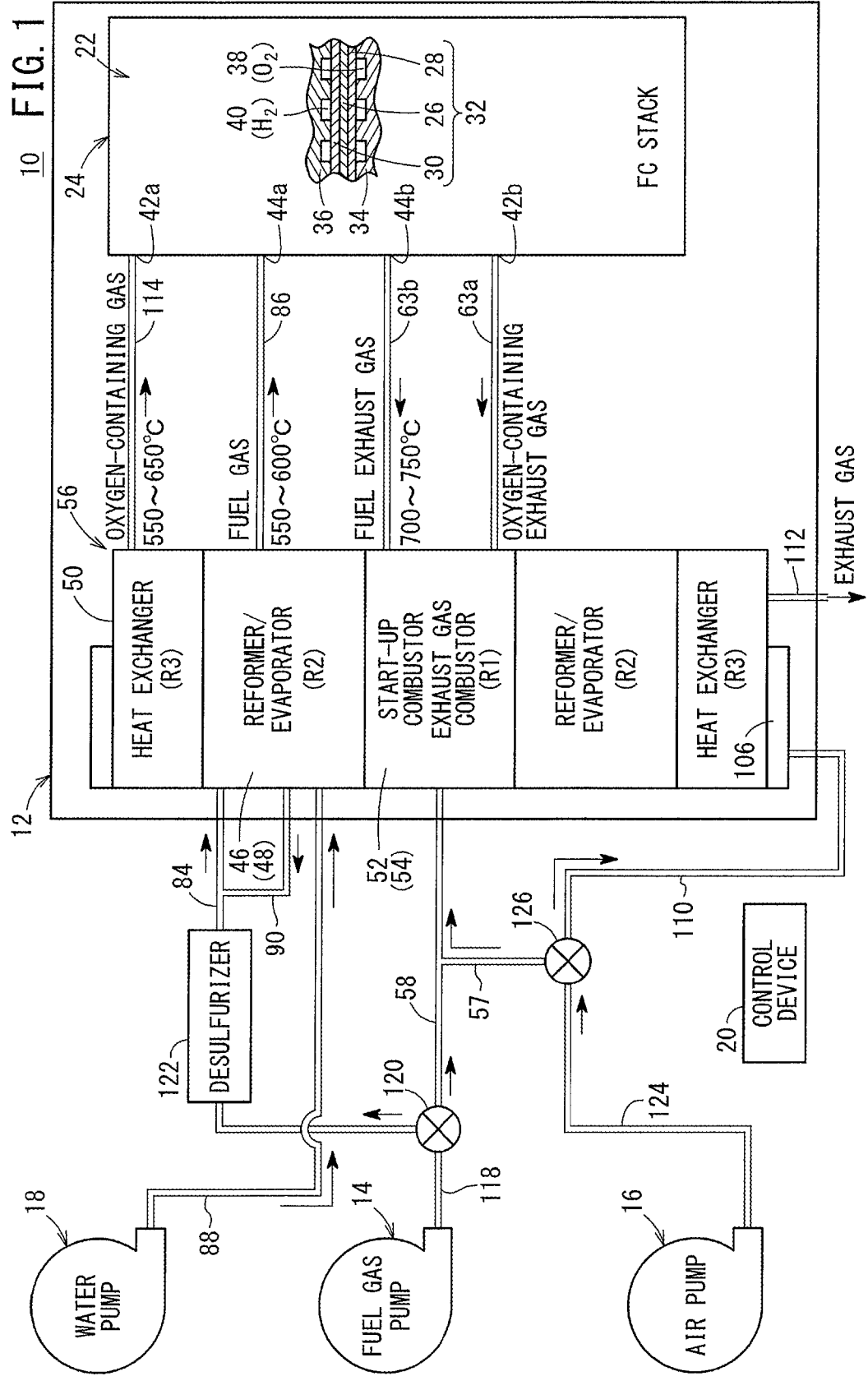
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, that is, several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel chiefly containing hydrocarbon (e.g., city gas) and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Figure 2:
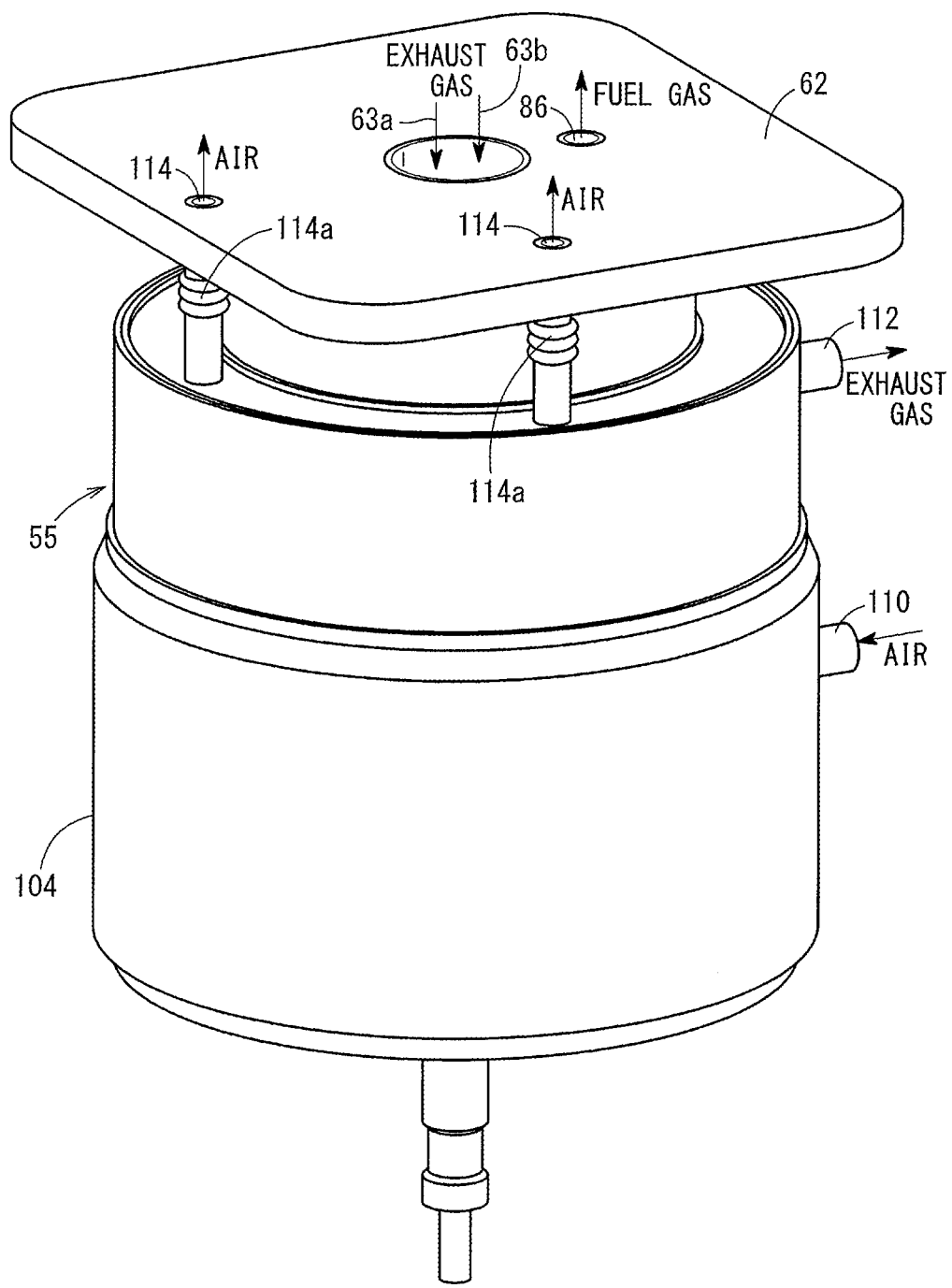
FIG. 2 is a perspective view showing FC peripheral equipment of the fuel cell module.

Basically, the fuel cell module 12 is made up of the fuel cell stack 24 and FC (fuel cell) peripheral equipment (BOP) 56 (see FIGS. 1 and 2). The FC peripheral equipment 56 includes the reformer 46, the evaporator 48, the heat exchanger 50, the exhaust gas combustor 52, and the start-up combustor 54.

Figure 3:
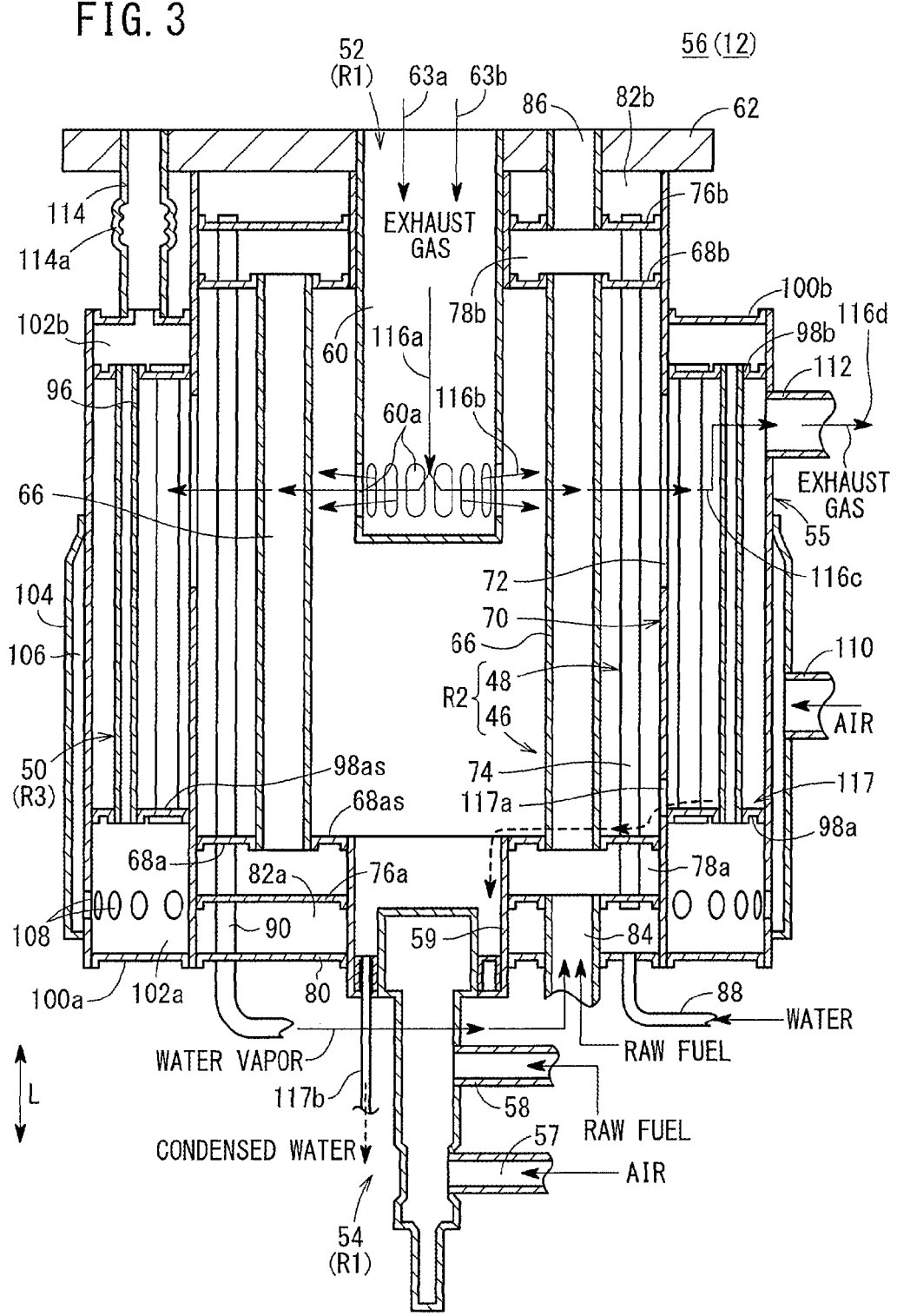
FIG. 3 is a cross sectional view showing the FC peripheral equipment.
Figure 4:
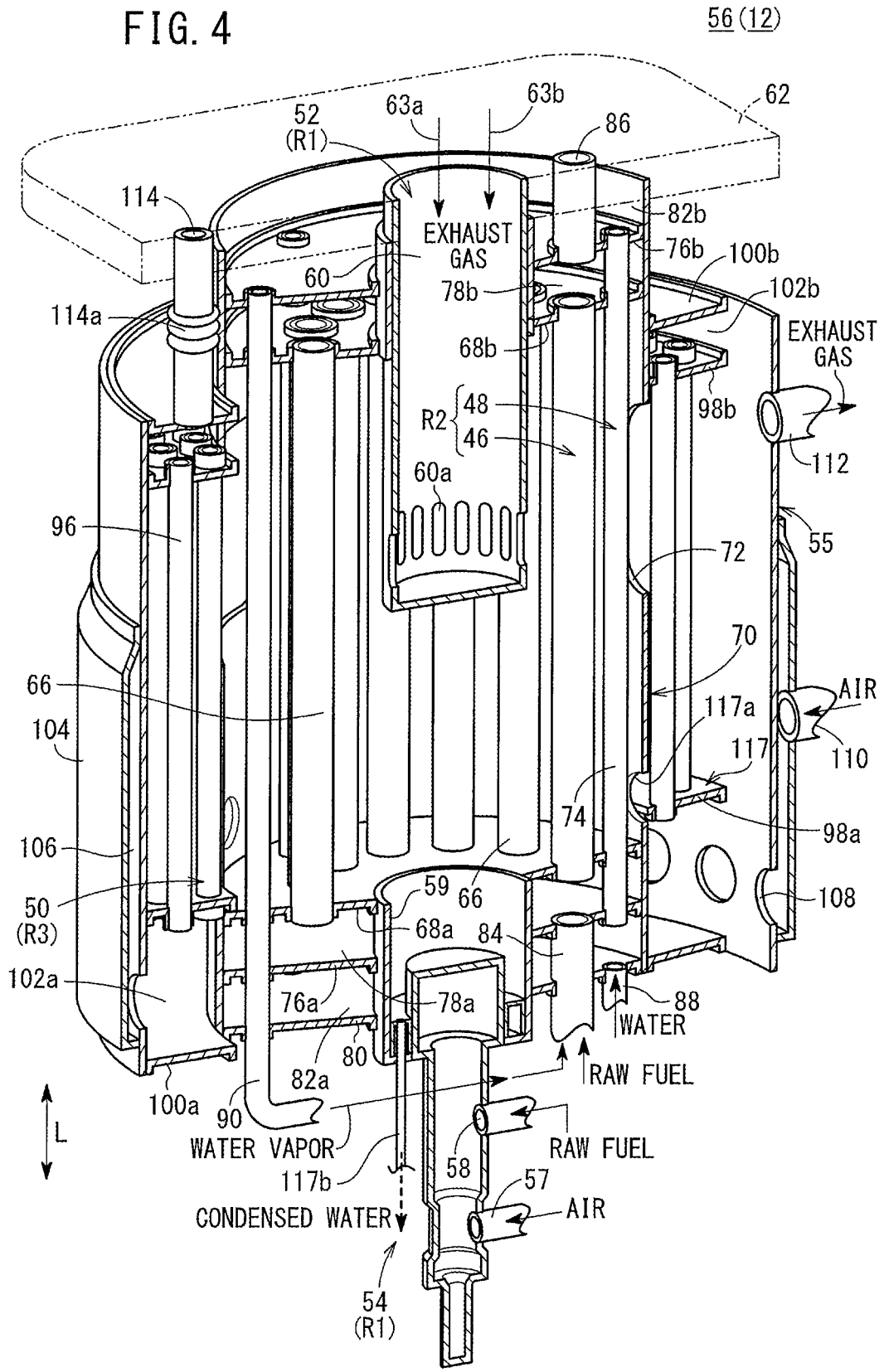
FIG. 4 is a perspective view with partial omission showing the FC peripheral equipment.
Figure 5:
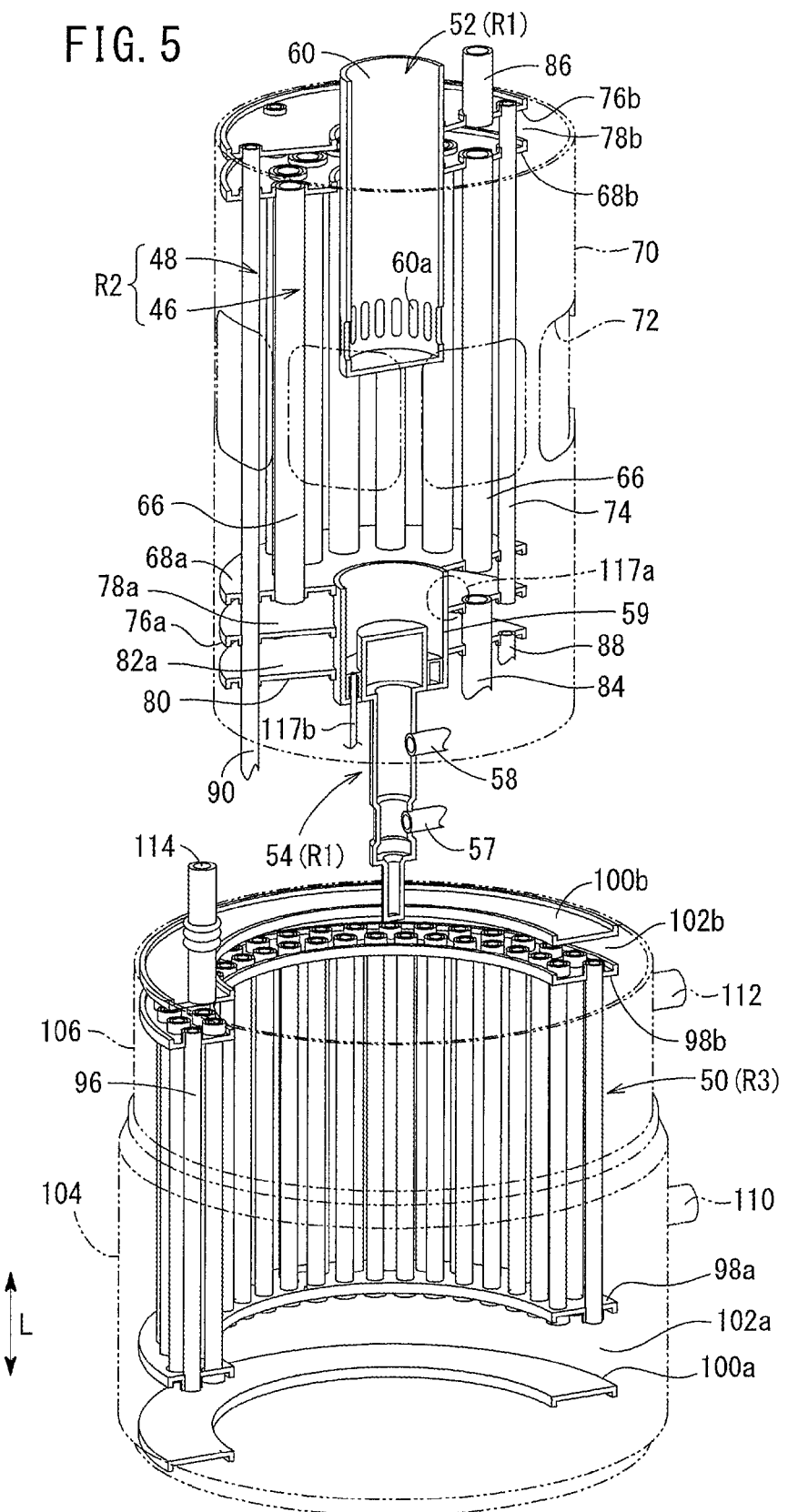
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the evaporator 48 are provided, an annular third area R3 formed around the second area R2 and where the heat exchanger 50 is provided. A cylindrical outer member 55 constituting an outer wall is provided on the outer peripheral side of the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel. An end-side combustion portion of the start-up combustor 54 is surrounded by a tubular member 59.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of the marginal end of the combustion cup 60 on the bottom side. A stack attachment plate 62 is engaged with the other end of the combustion cup 60 on the opening side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (more specifically, fuel exhaust gas) and the oxygen-containing gas (more specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 is filled with reforming catalyst pellets (not shown). Each of the reforming pipes 66 has one end (lower end) fixed to a first lower ring member 68a, and the other end (upper end) fixed to a first upper ring member 68b.

The outer circumferential portions of the first lower ring member 68a and the first upper ring member 68b are fixed to the inner circumferential portion of a cylindrical partition plate 70 by welding or the like. The inner circumferential portions of the first lower ring member 68a and the first upper ring member 68b are fixed to the outer circumferential portion of the combustion cup 60 of the exhaust gas combustor 52 and the outer circumferential portion of the tubular member 59 of the start-up combustor 54 by welding or the like. The partition plate 70 extends in an axial direction indicated by an arrow L, and an end of the partition plate 70 adjacent to the fuel cell stack 24 is fixed to the stack attachment plate 62. A plurality of openings 72 are formed in the outer circumference of the partition plate 70 in a circumferential direction at predetermined height positions.

Figure 6:
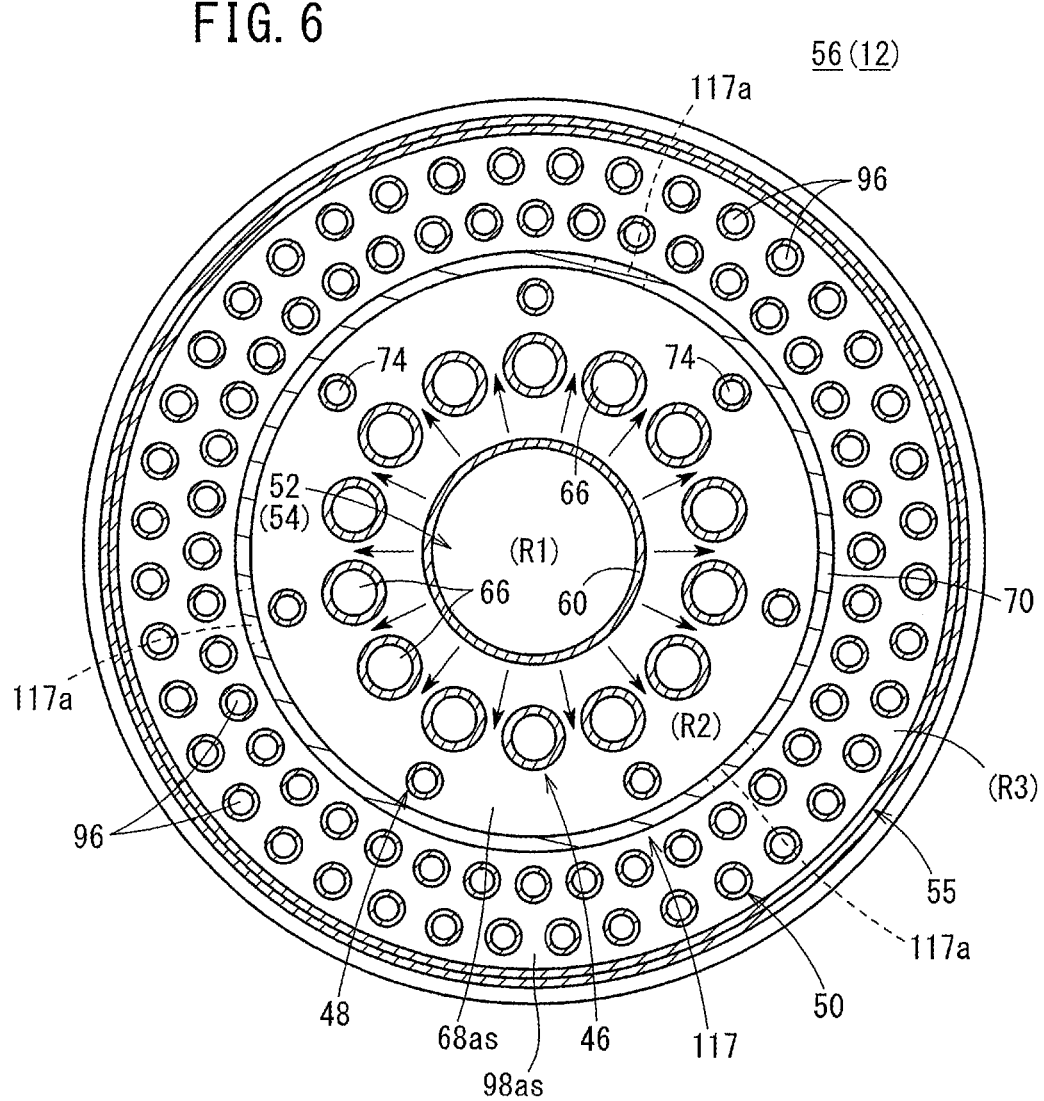
FIG. 6 is a cross sectional plan view showing the FC peripheral equipment.

The evaporator 48 has evaporation pipes (heat transmission pipes) 74 provided adjacent to, and outside the reforming pipes 66 of the reformer 46. As shown in FIG. 6, the reforming pipes 66 are arranged at equal intervals on a virtual circle, concentrically around the first area R1. The evaporation pipes 74 are arranged at equal intervals on a virtual circle, concentrically around the first area R1. The number of the evaporation pipes 74 is half of the number of the reforming pipes 66. The evaporation pipes 74 are positioned on the back side of every other position of the reforming pipe 66 (i.e., at positions spaced away from the center of the first area R1).

As shown in FIGS. 3 and 4, each of the evaporation pipes 74 has one end (lower end) which is fixed to a second lower ring member 76a by welding or the like, and the other end (upper end) which is fixed to a second upper ring member 76b by welding or the like. The outer circumferential portions of the second lower ring member 76a and the second upper ring member 76b are fixed to the inner circumferential portion of the partition plate 70 by welding or the like. The inner circumferential portions of the second lower ring member 76a and the second upper ring member 76b are fixed to the outer circumferential portion of the combustion cup 60 of the exhaust gas combustor 52 and the outer circumferential portion of the tubular member 59 of the start-up combustor 54 by welding or the like.

The second lower ring member 76a is positioned below the first lower ring member 68a (i.e., outside the first lower ring member 68a in the axial direction), and the second upper ring member 76b is positioned above the first upper ring member 68b (i.e., outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the partition plate 70 on the start-up combustor 54 side by welding or the like. An annular water supply chamber 82a is formed between the end ring member 80 and the second lower ring member 76a, and water is supplied to the water supply chamber 82a. An annular water vapor discharge chamber 82b is formed between the second upper ring member 76b and the stack attachment plate 62, and water vapor is discharged to the water vapor discharge chamber 82b. Both ends of each of the evaporation pipes 74 are opened to the water supply chamber 82a and the water vapor discharge chamber 82b.

The fuel gas discharge chamber 78b and the water vapor discharge chamber 82b are provided in a double deck manner, and the fuel gas discharge chamber 78b is provided on the inner side with respect to the water vapor discharge chamber 82b (i.e., below the water vapor discharge chamber 82b). The mixed gas supply chamber 78a and the water supply chamber 82a are provided in a double deck manner, and the mixed gas supply chamber 78a is provided on the inner side with respect to the water supply chamber 82a (i.e., above the water supply chamber 82a).

A raw fuel supply channel 84 is opened to the mixed gas supply chamber 78a, and an evaporation return pipe 90 described later is connected to a position in the middle of the raw fuel supply channel 84 (see FIG. 1). The raw fuel supply channel 84 has an ejector function, and generates negative pressure by the flow of the raw fuel for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

A water channel 88 is connected to the water supply chamber 82a. The water channel 88 is fixed to the end ring member 80 by welding or the like. One end of the evaporation return pipe 90 formed by at least one evaporation pipe 74 is provided in the water vapor discharge chamber 82b, and the other end of the evaporation return pipe 90 is connected to a position in the middle of the raw fuel supply channel 84 (see FIG. 1).

Figure 7:
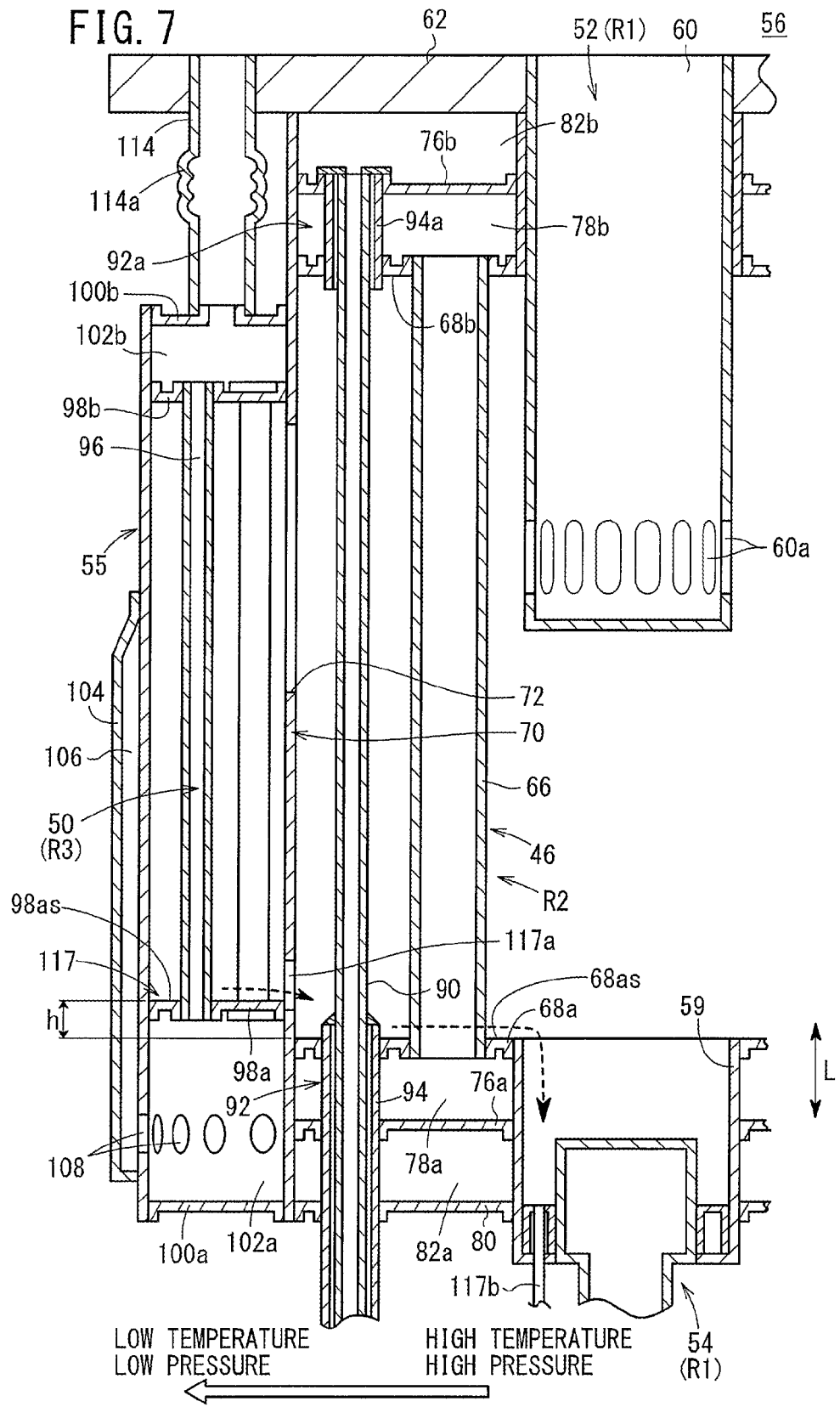
FIG. 7 is a cross sectional view showing part of the FC peripheral equipment.

As shown in FIG. 7, the evaporation return pipe 90 has dual pipe structure 92 in a portion thereof passing through the mixed gas supply chamber 78a and the water supply chamber 82a. The dual pipe structure 92 includes an outer pipe 94. The outer pipe 94 surrounds the evaporation return pipe 90, and the outer pipe 94 is positioned coaxially with the evaporation return pipe 90. The outer pipe 94 is fixed to the first lower ring member 68a, the second lower ring member 76a, and the end ring member 80 by welding or the like, and extends in the direction indicated by an arrow L. A gap is provided between the outer circumference of the evaporation return pipe 90 and the inner circumference of the outer pipe 94. This gap may not be provided.

The evaporation return pipe 90 may have dual pipe structure 92a in a portion thereof passing through the fuel gas discharge chamber 78b. The dual pipe structure 92a includes an outer pipe 94a. The outer pipe 94a surrounds the evaporation return pipe 90, and the outer pipe 94a is positioned coaxially with the evaporation return pipe 90. The outer pipe 94a is fixed to the first upper ring member 68b and the second upper ring member 76b by welding or the like, and extends in the direction indicated by the arrow L. A gap is formed between the outer circumference of the evaporation return pipe 90 and the inner circumference of the outer pipe 94a as necessary. The lower end of the outer pipe 94a is not welded to the first upper ring member 68b.

As shown in FIGS. 3 and 4, the heat exchanger 50 includes a plurality of heat exchange pipes (heat transmission pipes) 96 which are provided along and around the outer circumference of the partition plate 70. Each of the heat exchange pipes 96 has one end (lower end) fixed to a lower ring member 98a, and the other end (upper end) fixed to an upper ring member 98b.

A lower end ring member 100a is provided below the lower ring member 98a, and an upper end ring member 100b is provided above the upper ring member 98b. The lower end ring member 100a and the upper end ring member 100b are fixed to the outer circumference of the partition plate 70 and the inner circumference of the outer member 55 by welding or the like.

An annular oxygen-containing gas supply chamber 102a to which the oxygen-containing gas is supplied is formed between the lower ring member 98a and the lower end ring member 100a. An annular oxygen-containing gas discharge chamber 102b is formed between the upper ring member 98b and the upper end ring member 100b. The heated oxygen-containing gas is discharged to the oxygen-containing gas discharge chamber 102b. Both ends of each of the heat exchange pipes 96 are fixed to the lower ring member 98a and the upper ring member 98b by welding or the like, and opened to the oxygen-containing gas supply chamber 102a and the oxygen-containing gas discharge chamber 102b.

The mixed gas supply chamber 78a and the water supply chamber 82a are placed on the radially inward side relative to the inner circumference of the oxygen-containing gas supply chamber 102a. The oxygen-containing gas discharge chamber 102b is provided outside the fuel gas discharge chamber 78b at a position offset downward from the fuel gas discharge chamber 78b.

A cylindrical cover member 104 is provided on the outer circumferential portion of the outer member 55. The center position of the cylindrical cover member 104 is shifted downward. Both of upper and lower ends (both of axial ends) of the cover member 104 are fixed to the outer member 55 by welding or the like, and a heat recovery area (chamber) 106 is formed between the cover member 104 and the outer circumferential portion of the outer member 55.

A plurality of holes 108 are formed circumferentially in a lower marginal end portion of the outer member 55 of the oxygen-containing gas supply chamber 102a, and the oxygen-containing gas supply chamber 102a communicates with the heat recovery area 106 through the holes 108. An oxygen-containing gas supply pipe 110 communicating with the heat recovery area 106 is connected to the cover member 104. An exhaust gas pipe 112 communicating with the third area R3 is connected to an upper portion of the outer member 55.

For example, one end of each of two oxygen-containing gas pipes 114 is provided in the oxygen-containing gas discharge chamber 102b. Each of the oxygen-containing gas pipes 114 has a stretchable member such as a bellows 114a between the upper end ring member 100b and the stack attachment plate 62. The other end of each of the oxygen-containing gas pipes 114 extends through the stack attachment plate 62, and is connected to the oxygen-containing gas supply passage 42a of the fuel cell stack 24 (see FIG. 1).

As shown in FIG. 3, a first combustion gas channel 116a as a passage of the combustion gas is formed in the first area R1, and a second combustion gas channel 116b as a passage of the combustion gas that has passed through the holes 60a is formed in the second area R2. A third combustion gas channel 116c as a passage of the combustion gas that has passed through the openings 72 is formed in the third area R3. Further, a fourth combustion gas channel 116d is formed as a passage after the exhaust gas pipe 112. The second combustion gas channel 116b forms the reformer 46 and the evaporator 48, and the third combustion gas channel 116c forms the heat exchanger 50.

As shown in FIGS. 3, 4, and 7, the FC peripheral equipment 56 includes a condensed water recovery mechanism 117 for recovering condensed water produced through condensation of water vapor contained in the combustion gas, by flowing the condensed water through the third area R3, the second area R2, and the first area R1 in that order.

The condensed water recovery mechanism 117 includes a first inner ring surface 68as of the first lower ring member 68a forming the bottom portion of the second area R2, and a second inner ring surface 98as of the lower ring member 98a forming the bottom portion of the third area R3. As shown in FIG. 7, the height of the bottom portion formed by the second inner ring surface 98as is a dimension h higher than the height of the bottom portion formed by the first inner ring surface 68as.

The condensed water recovery mechanism 117 has condensed water passage holes 117a formed in a lower portion (which is opposite to an upper portion where the fuel cell stack 24 is provided) of the partition plate 70. As shown in FIG. 6, the condensed water recovery mechanism 117 has three or more condensed water passage holes 117a arranged circumferentially. In the first embodiment, the three condensed water passage holes 117a are arranged at equal angular intervals around the center of the FC peripheral equipment 56.

Figure 8:
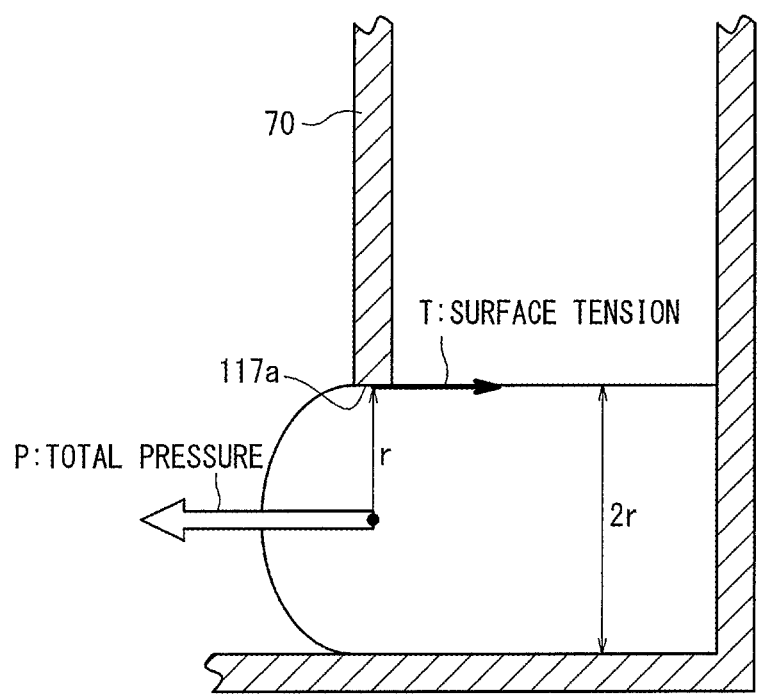
FIG. 8 is an explanatory diagram of a condensed water passage hole of a condensed water recovery mechanism provided in the FC peripheral equipment.

Each of the condensed water passage holes 117a has an opening diameter (2 r) which is set to be 8 mm or more. As shown in FIG. 8, in order to flow the condensed water through the condensed water passage hole 117a, it is necessary to satisfy an inequality P>T where P represents the total pressure generated in the opening area of the condensed water passage hole 117a, and T represents a surface tension generated therein.

From the above inequality, the inequality of $r \times \rho g \times \pi r^2 > 2\pi r \times T$ is derived where r represents the opening radius, ρ represents the water density, g represents the acceleration of gravity, and T represents the surface tension of water. Then, the inequality of r>3.85 mm is obtained, that is 2r>7.7. Therefore, the opening diameter is set to be 8 mm or more.

In the partition plate 70, the upper limit of the opening diameter should preferably be set such that the pressure loss at the condensed water passage hole 117a is equal to or lower than, for example, 10% of the pressure loss at the opening 72. The upper limit can be determined based on the ratio of the cross sectional area of the openings 72 to the cross sectional area of the condensed water passage holes 117a, which is 10:1. The cross sectional areas are calculated from the number of the openings 72 and the opening diameter thereof, and the number of the condensed water passage holes 117a and the opening diameter thereof.

As shown in FIGS. 3, 4, and 7, at a lower portion of the first area R1, a recovery pipe 117b is provided adjacent to the start-up combustor 54. By connecting the recovery pipe 117b, for example, in the middle of the raw fuel supply channel 84, it is possible to recover water vapor that is vaporized again by the exhaust gas of the first area R1 and use the recovered water vapor for reforming.

As shown in FIG. 1, the raw fuel supply apparatus 14 includes a raw fuel channel 118. The raw fuel channel 118 is branched into the raw fuel supply channel 84 and the raw fuel supply pipe 58 through a raw fuel regulator valve 120. A desulfurizer 122 for removing sulfur compounds in the city gas (raw fuel) is provided in the raw fuel supply channel 84.

The oxygen-containing gas supply apparatus 16 includes an oxygen-containing gas channel 124. The oxygen-containing gas channel 124 is branched into the oxygen-containing gas supply pipe 110 and the air supply pipe 57 through an oxygen-containing gas regulator valve 126. The water supply apparatus 18 is connected to the evaporator 48 through the water channel 88.

Operation of the fuel cell system 10 will be described below.

At the time of starting operation of the fuel cell system 10, the air (oxygen-containing gas) and the raw fuel are supplied to the start-up combustor 54. More specifically, by operation of the air pump, the air is supplied to the oxygen-containing gas channel 124. By adjusting the opening degree of the oxygen-containing gas regulator valve 126, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 118. By regulating the opening degree of the raw fuel regulator valve 120, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2. Further, the combustion gas is supplied to the third area R3, and then, the combustion gas is discharged to the outside of the fuel cell module 12 through the exhaust gas pipe 112.

As shown in FIGS. 3 and 4, the reformer 46 and the evaporator 48 are provided in the second area R2, and the heat exchanger 50 is provided in the third area R3. Thus, the combustion gas discharged from the first area R1 first heats the reformer 46, next heats the evaporator 48, and then heats the heat exchanger 50.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

More specifically, as shown in FIG. 1, the opening degree of the oxygen-containing gas regulator valve 126 is adjusted such that the flow rate of the air supplied to the oxygen-containing gas supply pipe 110 is increased, and the opening degree of the raw fuel regulator valve 120 is adjusted such that the flow rate of the raw fuel supplied to the raw fuel supply channel 84 is increased. Further, by operation of the water supply apparatus 18, the water is supplied to the water channel 88. The air is supplied from the oxygen-containing gas supply pipe 110 to the heat recovery area 106 of the outer member 55. Thus, the air flows through the holes 108 into the oxygen-containing gas supply chamber 102a.

Therefore, as shown in FIGS. 3 and 4, the air flows into the heat exchanger 50, and after the air is temporarily supplied to the oxygen-containing gas supply chamber 102a, while the air is moving inside the heat exchange pipes 96, the air is heated by heat exchange with the combustion gas supplied into the third area R3. After the heated air is temporarily supplied to the oxygen-containing gas discharge chamber 102b, the air is supplied to the oxygen-containing gas supply passage 42a of the fuel cell stack 24 through the oxygen-containing gas pipes 114 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized in the desulfurizer 122, the raw fuel flows through the raw fuel supply channel 84, and moves toward the reformer 46.

In the evaporator 48, after the water is temporarily supplied to the water supply chamber 82a, while water is moving inside the evaporation pipes 74, the water is heated by the combustion gas flowing through the second area R2, and vaporized. After the water vapor flows into the water vapor discharge chamber 82b, the water vapor is supplied to the evaporation return pipe 90 connected to the water vapor discharge chamber 82b. Thus, the water vapor flows inside the evaporation return pipe 90, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and is then steam-reformed. After removal (reforming) of hydrocarbon of $C_{2+}$, a reformed gas chiefly containing methane is obtained.

After this reformed gas is heated, the reformed gas is temporarily supplied to the fuel gas discharge chamber 78b as the fuel gas. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30. In the meanwhile, the air is supplied to the cathode 28. Thus, electricity is generated in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60a. Therefore, as shown in FIG. 3, the combustion gas supplied into the combustion cup 60 flows through the holes 60a from the first area R1 into the second area R2. Then, after the combustion gas is supplied to the third area R3, the combustion gas is discharged to the outside of the fuel cell module 12.

In the FC peripheral equipment 56, the combustion gas flows through the first area R1, the second area R2, and the third area R3 in that order, and exchanges heat with each area. Thereafter, the combustion gas is discharged to the outside. At that time, water vapor contained in the combustion gas is condensed due to decrease of the temperature of the combustion gas. The condensed water tends to stagnate, in particular, easily in the third area R3 where the temperature is relatively low.

As shown in FIG. 7, the condensed water stagnating in the third area R3 moves to the second area R2 through the condensed water passage holes 117a of the condensed water recovery mechanism 117, which are formed in the lower portion of the partition plate 70. Then, the condensed water moves to the first area R1, and is thereafter introduced into the tubular member 59 of the start-up combustor 54. In the first area R1, hot exhaust gas has been produced, whereby the condensed water is evaporated to produce water vapor. The produced water vapor (including the condensed water) is recovered through the recovery pipe 117b.

In the first embodiment, the FC peripheral equipment 56 includes the first area R1 where the exhaust gas combustor 52 and the start-up combustor 54 are provided, the annular second area R2 around the first area R1 and where the reformer 46 and the evaporator 48 are provided, and the annular third area R3 around the second area R2 and where the heat exchanger 50 is provided.

That is, the first area R1 is provided at the center, the annular second area R2 is provided around the first area R1, and the annular third area R3 is provided around the second area R2. Heat waste and heat radiation can be suppressed suitably. Thus, improvement in the heat efficiency is achieved, thermally self-sustaining operation is facilitated, and the structure of the entire fuel cell module 12 can be made simple and compact. Thermally self-sustaining operation herein means operation where the operating temperature of the fuel cell 22 is maintained using only heat energy generated in the fuel cell 22 itself, without supplying additional heat from the outside.

Further, the FC peripheral equipment 56 includes the condensed water recovery mechanism 117. Thus, the condensed water produced through condensation of water vapor contained in the combustion gas can flow through the third area R3, the second area R2, and the first area R1 in that order, i.e., from the low temperature side to the high temperature side.

Thus, rechange of the condensed water into vapor state is facilitated, and as a result, the condensed water does not stagnate in the FC peripheral equipment 56. Therefore, the condensed water is prevented from affecting the durability of the FC peripheral equipment 56 as much as possible, and the recovered condensed water can be utilized as water vapor for reforming.

Further, in the first embodiment, as shown in FIG. 3, the reformer 46 includes the annular mixed gas supply chamber 78a, the annular fuel gas discharge chamber 78b, the reforming pipes 66, and the second combustion gas channel 116b. The mixed gas is supplied to the mixed gas supply chamber 78a, and the produced fuel gas is discharged into the fuel gas discharge chamber 78b. Each of the reforming pipes 66 has one end connected to the mixed gas supply chamber 78a, and the other end connected to the fuel gas discharge chamber 78b. The second combustion gas channel 116b supplies the combustion gas to the space between the reforming pipes 66.

The evaporator 48 includes the annular water supply chamber 82a, the annular water vapor discharge chamber 82b, the evaporation pipes 74, and the second combustion gas channel 116b. The water is supplied to the water supply chamber 82a, and the water vapor is discharged into the water vapor discharge chamber 82b. Each of the evaporation pipes 74 has one end connected to the water supply chamber 82a, and the other end connected to the water vapor discharge chamber 82b. The second combustion gas channel 116b supplies the combustion gas to the space between the evaporation pipes 74.

The heat exchanger 50 includes the annular oxygen-containing gas supply chamber 102a, the annular oxygen-containing gas discharge chamber 102b, the heat exchange pipes 96, and the third combustion gas channel 116c. The oxygen-containing gas is supplied to the oxygen-containing gas supply chamber 102a, and the heated oxygen-containing gas is discharged into the oxygen-containing gas discharge chamber 102b. Each of the heat exchange pipes 96 has one end connected to the oxygen-containing gas supply chamber 102a, and the other end connected to the oxygen-containing gas discharge chamber 102b. The third combustion gas channel 116c supplies the combustion gas to the space between the heat exchange pipes 96.

As described above, the annular supply chambers (mixed gas supply chamber 78a, water supply chamber 82a, and oxygen-containing gas supply chamber 102a), the annular discharge chambers (fuel gas discharge chamber 78b, water vapor discharge chamber 82b, and oxygen-containing gas discharge chamber 102b) and the pipes (reforming pipes 66, evaporation pipes 74, and heat exchange pipes 96) are provided as basic structure. Thus, simple structure is achieved easily. Accordingly, the production cost of the fuel cell module 12 is reduced effectively. Further, by changing the volumes of the supply chambers and the discharge chambers, and the length, the diameter, and the number of the pipes, a suitable operation can be achieved depending on various operating conditions, and the design flexibility of the fuel cell module can be enhanced.

Further, the fuel gas discharge chamber 78b and the water vapor discharge chamber 82b are provided in a double deck manner, and the fuel gas discharge chamber 78b is provided on the inner side with respect to the water vapor discharge chamber 82b. The mixed gas supply chamber 78a and the water supply chamber 82a are provided in a double deck manner, and the mixed gas supply chamber 78a is provided on the inner side with respect to the water supply chamber 82a. In the structure, in the second area R2, the reformer 46 and the evaporator 48 can be arranged compactly and efficiently. As a result, reduction in the overall size of the FC peripheral equipment 56 is achieved easily.

Further, the mixed gas supply chamber 78a is formed between the first lower ring member (inner ring) 68a into which ends of the reforming pipes 66 are inserted and the second lower ring member (outer ring) 76a spaced away from the first lower ring member 68a. The fuel gas discharge chamber 78b is formed between the first upper ring member (inner ring) 68b into which the other ends of the reforming pipes 66 are inserted and the second upper ring member (outer ring) 76b spaced away from the first upper ring member 68b.

Further, the water supply chamber 82a is formed between the second lower ring member (inner ring) 76a into which ends of the evaporation pipes 74 are inserted and the end ring member (outer ring) 80 spaced away from the second lower ring member 76a. The water vapor discharge chamber 82b is formed between the second upper ring member (inner ring) 76b into which the other ends of the evaporation pipes 74 are inserted and the stack attachment plate (outer ring) 62 spaced away from the second upper ring member 76b.

Likewise, the oxygen-containing gas supply chamber 102a is formed between the lower ring member (inner ring) 98a into which ends of the heat exchange pipes 96 are inserted and the lower end ring member (outer ring) 100a spaced away from the lower ring member 98a. The oxygen-containing gas discharge chamber 102b is formed between the upper ring member (inner ring) 98b into which the other ends of the heat exchange pipes 96 are inserted and the upper end ring member (outer ring) 100b spaced away from the upper ring member 98b.

In the structure, each of the mixed gas supply chamber 78a, the fuel gas discharge chamber 78b, the water supply chamber 82a, the water vapor discharge chamber 82b, the oxygen-containing gas supply chamber 102a, and the oxygen-containing gas discharge chamber 102b is made of the inner ring and the outer ring, and the structure of these chambers is simplified effectively. Thus, the production cost is reduced effectively, and the size reduction is achieved easily.

Further, the fuel gas discharge chamber 78b, the water vapor discharge chamber 82b, and the oxygen-containing gas discharge chamber 102b are provided at the side of one end adjacent to the fuel cell stack 24, and the mixed gas supply chamber 78a, the water supply chamber 82a, and the oxygen-containing gas supply chamber 102a are provided at the side of the other end distant from the fuel cell stack 24.

In the structure, the reactant gas immediately after heating and the reactant gas immediately after reforming (fuel gas and oxygen-containing gas) can be supplied to the fuel cell stack 24 promptly. Further, the exhaust gas from the fuel cell stack 24 can be supplied to the exhaust gas combustor 52, the reformer 46, the evaporator 48, and the heat exchanger 50 of the FC peripheral equipment 56 while decrease in the temperature of the exhaust gas from the fuel cell stack 24 due to heat radiation is suppressed as much as possible. Thus, improvement in the heat efficiency is achieved, and thermally self-sustaining operation is facilitated.

Further, the condensed water recovery mechanism 117 includes a first inner ring surface 68as of the first lower ring member 68a forming the bottom portion of the second area R2, and a second inner ring surface 98as of the lower ring member 98a forming the bottom portion of the third area R3. As shown in FIG. 7, the height of the bottom portion formed by the second inner ring surface 98as is a dimension h higher than the height of the bottom portion formed by the first inner ring surface 68as.

Thus, the condensed water can flow from the outer side (low temperature side) to the inner side (high temperature side) of the FC peripheral equipment 56, and rechange of the condensed water into vapor state can be facilitated. Therefore, the condensed water does not stagnate in the FC peripheral equipment 56, and it is possible to prevent the condensed water from affecting the durability of the FC peripheral equipment 56 and to utilize the recovered condensed water as water vapor for reforming.

The FC peripheral equipment 56 includes a partition plate 70 arranged vertically between the second area R2 and the third area R3. The condensed water recovery mechanism 117 has the condensed water passage hole 117a formed in the lower portion of the partition plate 70 which is opposite to the upper portion where the fuel cell stack 24 is provided.

In the structure, blow-through of the combustion gas can be suppressed suitably thereby to further improve the heat efficiency, whereby thermally self-sustaining operation can be facilitated reliably. Further, the condensed water can move from the outer side (low temperature side) to the inner side (high temperature side) of the FC peripheral equipment 56 through the condensed water passage holes 117a of the partition plate 70. Thus, rechange of the condensed water into vapor state is facilitated, and consequently the condensed water does not stagnate in the FC peripheral equipment 56. Therefore, condensed water is prevented from affecting the durability of the FC peripheral equipment 56 as much as possible, and the recovered condensed water can be utilized as water vapor for reforming.

Further, as shown in FIG. 6, three or more condensed water passage holes 117a are arranged circumferentially. Thus, even if the FC peripheral equipment 56 is inclined due to an installation condition or the like of the FC peripheral equipment 56, the condensed water can be recovered reliably. Therefore, it is possible to prevent the condensed water from affecting the durability of the FC peripheral equipment 56 as much as possible.

Still further, the opening diameter of the condensed water passage hole 117a is set to be 8 mm or more. Thus, the flow of the condensed water is not blocked by the surface tension of the condensed water, and accordingly it is possible to recover the condensed water reliably. Therefore, it is possible to prevent the condensed water from affecting the durability of the FC peripheral equipment 56 as much as possible.

Further, the fuel cell module 12 is a solid oxide fuel cell module. Therefore, the fuel cell module 12 is suitable for, in particular, high temperature type fuel cells such as SOFC.

Figure 9:
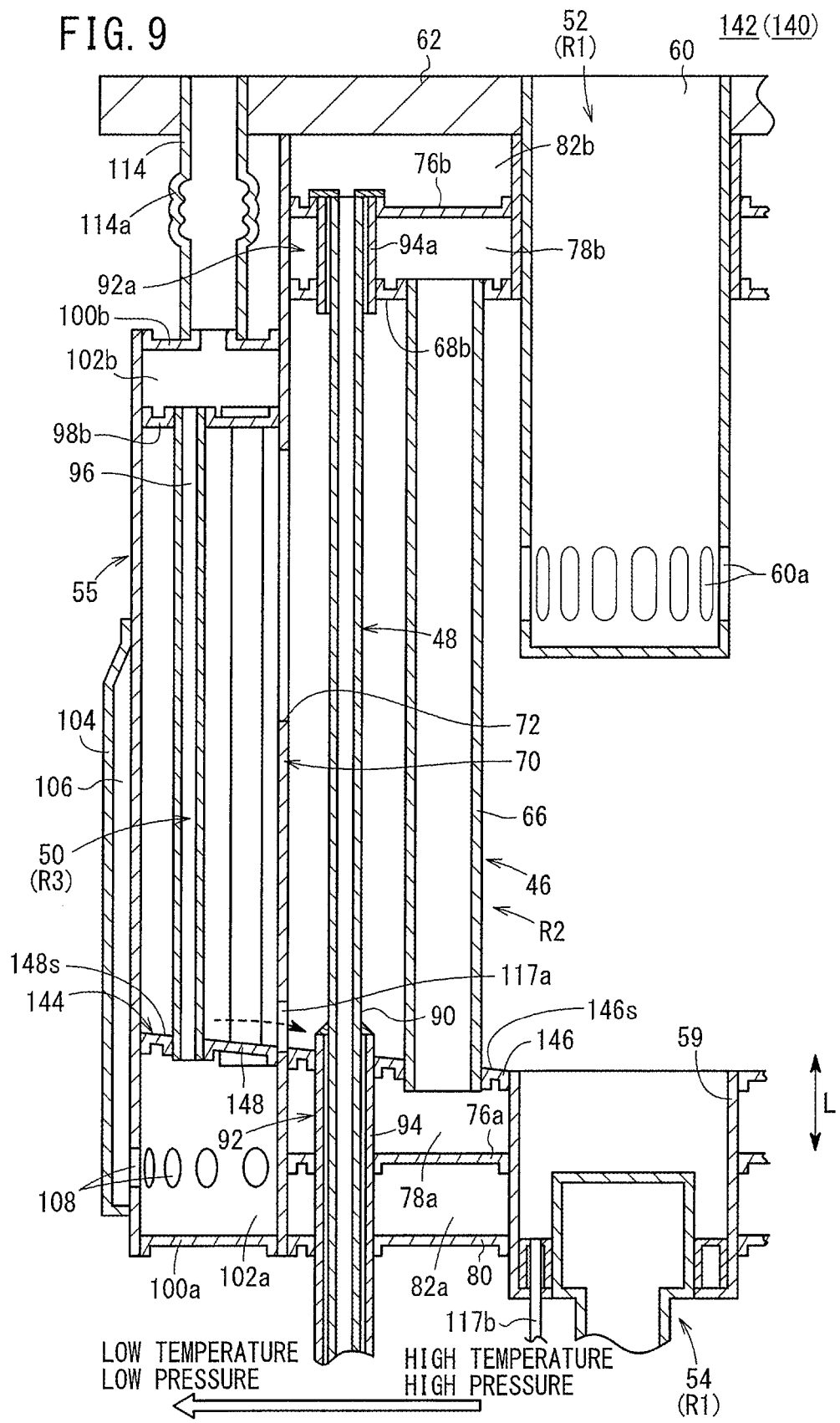
FIG. 9 is a partial sectional side view of FC peripheral equipment of a fuel cell module according to a second embodiment of the present invention.
Figure 10:
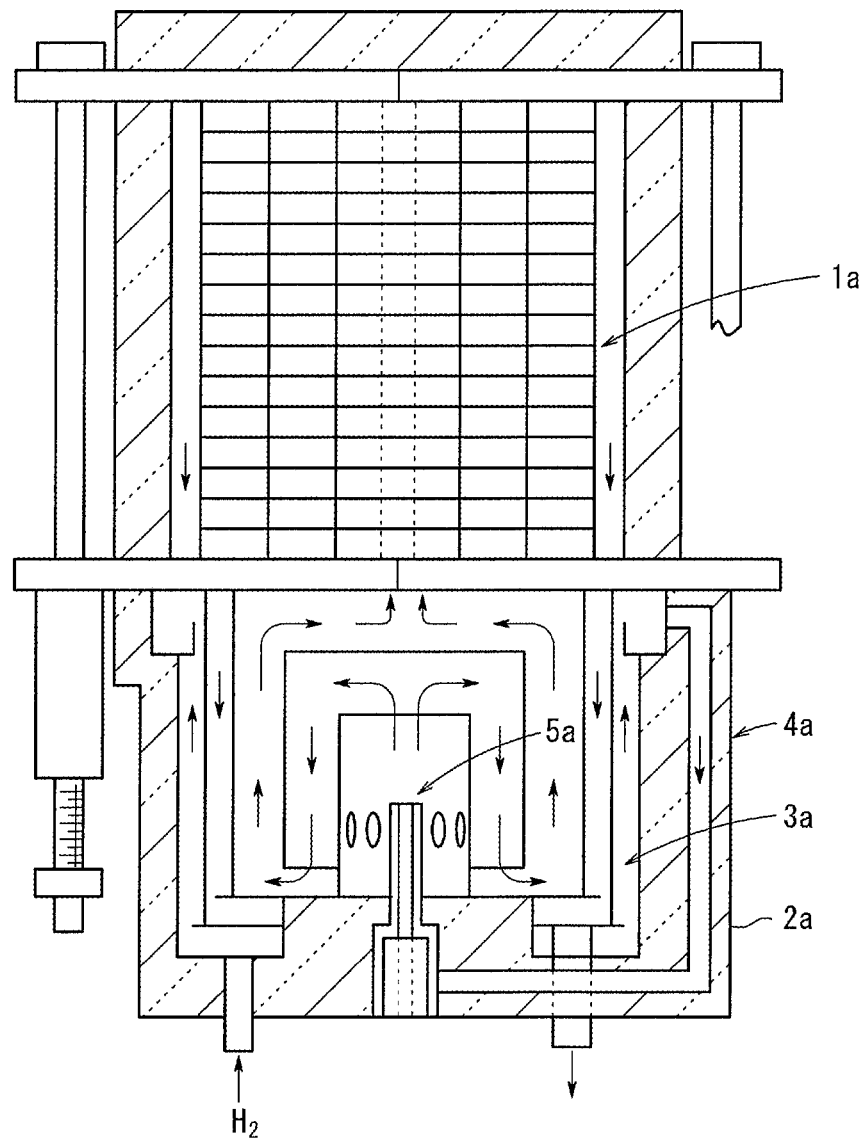
FIG. 10 is a view schematically showing a fuel cell battery disclosed in a conventional technique 1.
Figure 11:
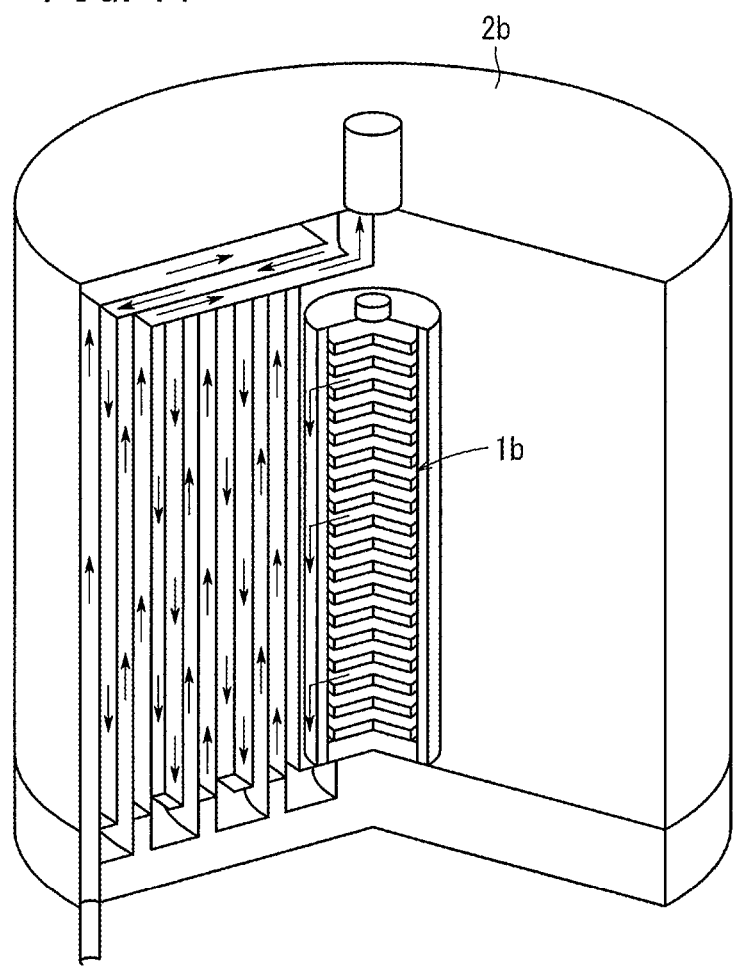
FIG. 11 is a perspective view with partial cutout showing a solid oxide fuel cell disclosed in a conventional technique 2.
Figure 12:
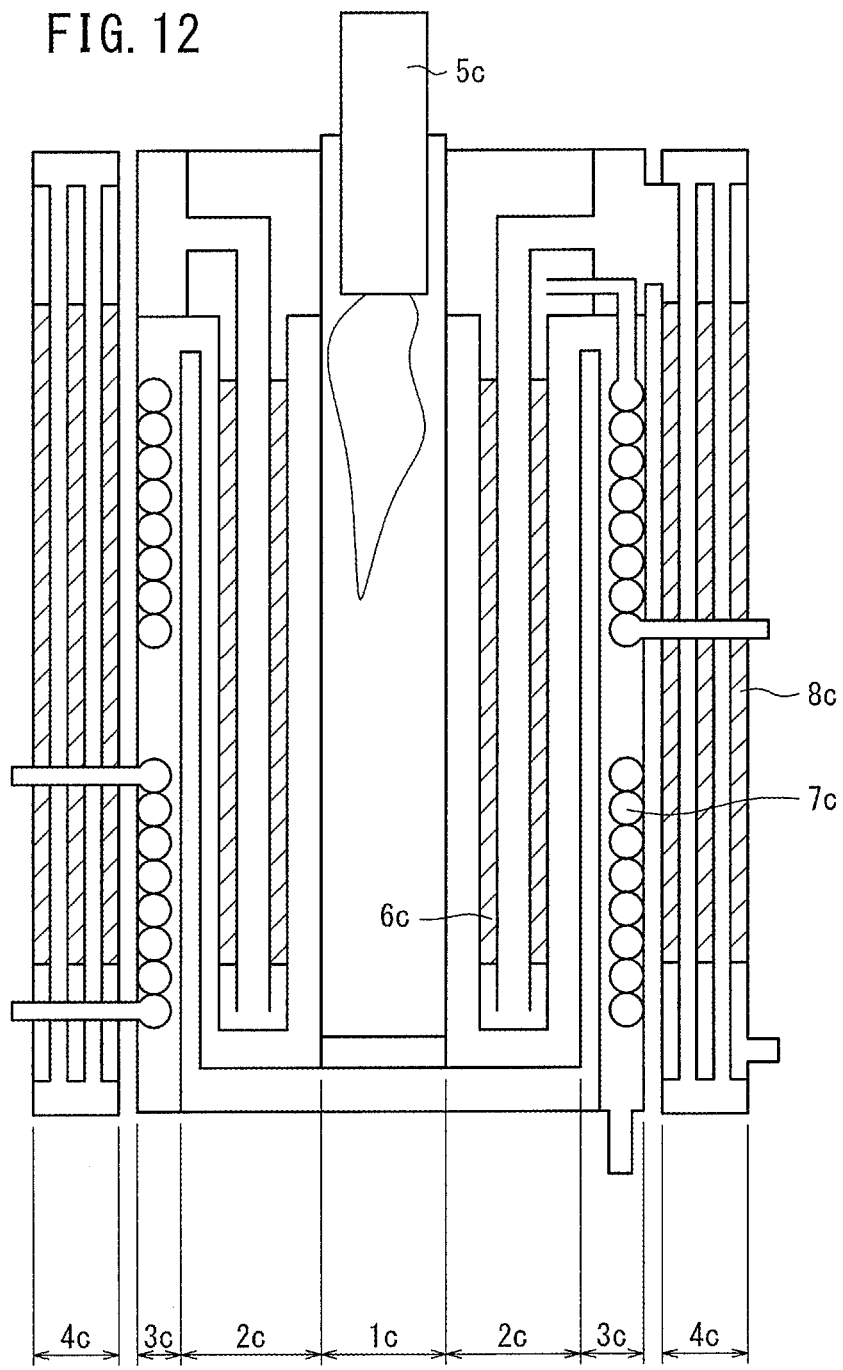
FIG. 12 is a view schematically showing a fuel cell system disclosed in a conventional technique 3.

FIG. 9 is a partial sectional side view showing structure of FC peripheral equipment 142 of a fuel cell module 140 according to a second embodiment of the present invention. The constituent elements of the fuel cell module 140 according to the second embodiment of the present invention that are identical to those of the fuel cell module 12 according to the first embodiment are labeled with the same reference numeral, and description thereof will be omitted.

The FC peripheral equipment 142 includes a condensed water recovery mechanism 144. The condensed water recovery mechanism 144 includes a first inner ring surface 146s of a first lower ring member 146 forming the bottom portion of the second area R2, and a second inner ring surface 148s of a lower ring member 148 forming the bottom portion of the third area R3.

The first lower ring member 146 corresponds to the first lower ring member 68a in the first embodiment, and the lower ring member 148 corresponds to the lower ring member 98a in the first embodiment. The first lower ring member 146 and the lower ring member 148 are downwardly inclined toward the center of the first area R1. That is, each of the first inner ring surface 146s and the second inner ring surface 148s is downwardly inclined from the outer circumferential end portion to the inner circumferential end portion. Totally, the downwardly-inclined surface is formed from the second inner ring surface 148s to the first inner ring surface 146s.

In the second embodiment, the condensed water in the third area R3 moves toward the partition plate 70 along the inclination of the second inner ring surface 148s, and thereafter moves to the second area R2 through the condensed water passage holes 117a. Further, the condensed water moves to the first area R1 along the inclination of the first inner ring surface 146s, and is then introduced in the tubular member 59. In the structure, the condensed water can be discharged more efficiently. Further, it is possible to obtain the same advantages as in the first embodiment, for example, that heat waste and heat radiation can be suppressed suitably thereby to improve the heat efficiency, whereby thermally self-sustaining operation is facilitated.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of water vapor and a raw fuel chiefly containing hydrocarbon to produce the fuel gas supplied to the fuel cell stack;
an evaporator for evaporating water, and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas, wherein the fuel cell module includes:
a first area where the exhaust gas combustor and the start-up combustor are provided;
an annular second area around the first area and where the reformer and the evaporator are provided;
an annular third area around the second area and where the heat exchanger is provided; and
a condensed water recovery mechanism for recovering condensed water produced through condensation of water vapor contained in the combustion gas, by flowing the condensed water through the third area, the second area, and the first area in that order.

2. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber, and another end connected to the fuel gas discharge chamber, and a combustion gas channel for supplying the combustion gas to spaces between the reforming pipes;
the evaporator includes an annular water supply chamber to which the water is supplied, an annular water vapor discharge chamber to which the water vapor is discharged, a plurality of evaporation pipes each having one end connected to the water supply chamber, and another end connected to the water vapor discharge chamber, and a combustion gas channel for supplying the combustion gas to spaces between the evaporation pipes; and
the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber, and another end connected to the oxygen-containing gas discharge chamber, and a combustion gas channel for supplying the combustion gas to spaces between the heat exchange pipes.

3. The fuel cell module according to claim 2, wherein the fuel gas discharge chamber and the water vapor discharge chamber are provided in a double deck manner, and the fuel gas discharge chamber is provided on an inner side with respect to the water vapor discharge chamber; and
the mixed gas supply chamber and the water supply chamber are provided in a double deck manner, and the mixed gas supply chamber is provided on an inner side with respect to the water supply chamber.

4. The fuel cell module according to claim 2, wherein each of the mixed gas supply chamber and the fuel gas discharge chamber is formed between an inner ring into which ends of the reforming pipes are inserted and an outer ring spaced away from the inner ring;
each of the water supply chamber and the water vapor discharge chamber is formed between an inner ring into which ends of the evaporation pipes are inserted and an outer ring spaced away from the inner ring; and
each of the oxygen-containing gas supply chamber and the oxygen-containing gas discharge chamber is formed between an inner ring into which ends of the heat exchange pipes are inserted and an outer ring spaced away from the inner ring.

5. The fuel cell module according to claim 2, wherein the fuel gas discharge chamber, the water vapor discharge chamber, and the oxygen-containing gas discharge chamber are provided at one end side adjacent to the fuel cell stack; and the mixed gas supply chamber, the water supply chamber, and the oxygen-containing gas supply chamber are provided at another end side distant from the fuel cell stack.

6. The fuel cell module according to claim 4, wherein the condensed water recovery mechanism comprises a first inner ring surface forming a bottom portion of the second area and a second inner ring surface forming a bottom portion of the third area; and a height of the bottom portion formed by the second inner ring surface is higher than a height of the bottom portion formed by the first inner ring surface.

7. The fuel cell module according to claim 4, further comprising a partition plate arranged vertically between the second area and the third area, wherein the condensed water recovery mechanism includes a condensed water passage hole formed in a lower portion of the partition plate which is opposite to an upper portion thereof where the fuel cell stack is provided.

8. The fuel cell module according to claim 7, wherein the condensed water passage hole comprises three condensed water passage holes which are arranged circumferentially.

9. The fuel cell module according to claim 7, wherein the condensed water passage hole has an opening diameter which is set to be 8 mm or more.

10. The fuel cell module according to claim 1, wherein the fuel cell module is a solid oxide fuel cell module.

* * * * *